United States Patent
Guruprasad et al.

(10) Patent No.: US 11,948,176 B2
(45) Date of Patent: Apr. 2, 2024

(54) RECOMMENDATIONS FOR FARMING PRACTICES BASED ON CONSUMER FEEDBACK COMMENTS AND PREFERENCE

(71) Applicant: International Business Machines Corporation, Armonk, NY (US)

(72) Inventors: Ranjini Bangalore Guruprasad, Bangalore (IN); Smitkumar Narotambhai Marvaniya, Bangalore (IN); Shantanu R. Godbole, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 570 days.

(21) Appl. No.: 16/828,132

(22) Filed: Mar. 24, 2020

(65) Prior Publication Data
US 2021/0304263 A1 Sep. 30, 2021

(51) Int. Cl.
*G06Q 30/0282* (2023.01)
*G06Q 30/0203* (2023.01)
*G06Q 50/02* (2012.01)

(52) U.S. Cl.
CPC ..... *G06Q 30/0282* (2013.01); *G06Q 30/0203* (2013.01); *G06Q 50/02* (2013.01)

(58) Field of Classification Search
CPC . G06Q 30/0282; G06Q 30/0203; G06Q 50/02
See application file for complete search history.

(56) References Cited

U.S. PATENT DOCUMENTS 8,679,461 B2   3/2014  Ley et al.
2007/0100653 A1*  5/2007  Ramer ............... G06Q 30/06
                                                     705/347

(Continued)

FOREIGN PATENT DOCUMENTS

CN   107220903 A   9/2017
JP   2005151851 A  6/2005

(Continued)

OTHER PUBLICATIONS

Wim Verbeke, Federico J.A. Pérez-Cueto, Marcia D. de Barcellos, Athanasios Krystallis, Klaus G. Grunert, European citizen and consumer attitudes and preferences regarding beef and pork, Meat Science, vol. 84, Issue 2, 2010, pp. 284-292, ISSN 0309-1740. (Year: 2010).*

(Continued)

*Primary Examiner* — Carrie S Gilkey
(74) *Attorney, Agent, or Firm* — Staney D. Ference, III; Elliot J. Shine

(57) ABSTRACT

One embodiment provides a method, including: receiving a plurality of consumer feedback comments regarding one of a plurality of agricultural food products, wherein each of the plurality of consumer feedback comments comprises information regarding a characteristic of a given agricultural food product, wherein each of the plurality of agricultural food products corresponds to an agricultural source producing an agricultural food product category; updating a rating of each of the plurality of agricultural food products based upon consumer feedback comments corresponding to a given agricultural food product, wherein the updating comprises aggregating the received consumer feedback comments with previously supplied consumer feedback comments for agricultural food products within the agricultural food product category of a given agricultural source; ranking the plurality of agricultural food products based upon the ratings of the (Continued)

plurality of agricultural food products, wherein the ranking comprises ranking the plurality of agricultural food products against other agricultural food products within an agricultural food product category and produced by different agricultural sources; and providing, to the agricultural source, at least one recommendation with respect to a farming practice implemented by the given agricultural source, wherein the recommendation is based upon the ranking of an agricultural food product produced by the given agricultural source.

8 Claims, 4 Drawing Sheets

(56) References Cited

U.S. PATENT DOCUMENTS

| | | | | |
|---|---|---|---|---|
| 2009/0281870 A1* | 11/2009 | Sun | ........................ | G06Q 10/10 705/347 |
| 2011/0144218 A1 | 6/2011 | Posner et al. | | |
| 2012/0046994 A1* | 2/2012 | Reisman | ................. | G06Q 30/02 705/7.29 |
| 2013/0238432 A1* | 9/2013 | Bai | .................... | G06Q 30/0256 705/14.58 |
| 2014/0172638 A1* | 6/2014 | El-Hmayssi | ....... | G06Q 30/0613 705/26.41 |
| 2019/0236536 A1* | 8/2019 | Poolman | ............ | G06Q 30/0282 |
| 2021/0209705 A1* | 7/2021 | England | ................ | G06N 20/00 |

FOREIGN PATENT DOCUMENTS

| | | |
|---|---|---|
| JP | 2010287021 A | 12/2010 |
| KR | 20080098616 A | 11/2008 |
| WO | WO2001078522 A2 | 10/2001 |
| WO | WO2005036336 A2 | 4/2005 |
| WO | WO2018093890 A1 | 5/2018 |

OTHER PUBLICATIONS ibm, "smart planet: smarter food supply & aid", jan. 28, 2010, 7 pages, ip.com.

* cited by examiner

RECOMMENDATIONS FOR FARMING PRACTICES BASED ON CONSUMER FEEDBACK COMMENTS AND PREFERENCE

BACKGROUND

When producing an agricultural product (e.g., produce, meat products, grains, etc.) a farmer may take into account previously known consumer preferences, for example, product preferences, purchasing seasons, and the like, when selecting seeds, growing seasons, products to produce, increasing yield, or the like. Traditionally, these consumer preferences are identified based upon market data from previous seasons. With consumer preferences in mind, the farmer may employ practices and techniques that may result in a product that is preferred by consumers. While uncontrollable variables such as weather or geographical location may require different techniques and farming practices than those utilized by farmers in other growing locations, it is still possible for the producer to utilize techniques that provide consistent products. Consumer preferences may also vary based upon a geographical region of the consumer, so producers may need to vary growing practices based upon a region that the product is being produced for. If a farmer or producer produces consistent products that are preferred by consumers, retailers are more likely to purchase the products from those producers because the products will sell more easily.

BRIEF SUMMARY

In summary, one aspect of the invention provides a method, comprising: receiving a plurality of consumer feedback comments regarding one of a plurality of agricultural food products, wherein each of the plurality of consumer feedback comments comprises information regarding a characteristic of a given agricultural food product, wherein each of the plurality of agricultural food products corresponds to an agricultural source producing an agricultural food product category; updating a rating of each of the plurality of agricultural food products based upon consumer feedback comments corresponding to a given agricultural food product, wherein the updating comprises aggregating the received consumer feedback comments with previously supplied consumer feedback comments for agricultural food products within the agricultural food product category of a given agricultural source; ranking the plurality of agricultural food products based upon the ratings of the plurality of agricultural food products, wherein the ranking comprises ranking the plurality of agricultural food products against other agricultural food products within an agricultural food product category and produced by different agricultural sources; and providing, to the agricultural source, at least one recommendation with respect to a farming practice implemented by the given agricultural source, wherein the recommendation is based upon the ranking of an agricultural food product produced by the given agricultural source.

Another aspect of the invention provides an apparatus, comprising: at least one processor; and a computer readable storage medium having computer readable program code embodied wherewith and executable by the at least one processor, the computer readable program code comprising: computer readable program code configured to receive a plurality of consumer feedback comments regarding one of a plurality of agricultural food products, wherein each of the plurality of consumer feedback comments comprises information regarding a characteristic of a given agricultural food product, wherein each of the plurality of agricultural food products corresponds to an agricultural source producing an agricultural food product category; computer readable program code configured to update a rating of each of the plurality of agricultural food products based upon consumer feedback comments corresponding to a given agricultural food product, wherein the updating comprises aggregating the received consumer feedback comments with previously supplied consumer feedback comments for agricultural food products within the agricultural food product category of a given agricultural source; computer readable program code configured to rank the plurality of agricultural food products based upon the ratings of the plurality of agricultural food products, wherein the ranking comprises ranking the plurality of agricultural food products against other agricultural food products within an agricultural food product category and produced by different agricultural sources; and computer readable program code configured to provide, to the agricultural source, at least one recommendation with respect to a farming practice implemented by the given agricultural source, wherein the recommendation is based upon the ranking of an agricultural food product produced by the given agricultural source.

An additional aspect of the invention provides a computer program product, comprising: a computer readable storage medium having computer readable program code embodied therewith, the computer readable program code executable by a processor and comprising: computer readable program code configured to receive a plurality of consumer feedback comments regarding one of a plurality of agricultural food products, wherein each of the plurality of consumer feedback comments comprises information regarding a characteristic of a given agricultural food product, wherein each of the plurality of agricultural food products corresponds to an agricultural source producing an agricultural food product category; computer readable program code configured to update a rating of each of the plurality of agricultural food products based upon consumer feedback comments corresponding to a given agricultural food product, wherein the updating comprises aggregating the received consumer feedback comments with previously supplied consumer feedback comments for agricultural food products within the agricultural food product category of a given agricultural source; computer readable program code configured to rank the plurality of agricultural food products based upon the ratings of the plurality of agricultural food products, wherein the ranking comprises ranking the plurality of agricultural food products against other agricultural food products within an agricultural food product category and produced by different agricultural sources; and computer readable program code configured to provide, to the agricultural source, at least one recommendation with respect to a farming practice implemented by the given agricultural source, wherein the recommendation is based upon the ranking of an agricultural food product produced by the given agricultural source.

A further aspect of the invention provides a method, comprising: receiving consumer feedback comments regarding an agricultural food product being produced by an agricultural food production agricultural source, the consumer feedback comments comprising information related to a characteristic of the agricultural food product, wherein the characteristic comprises at least one of (i) the taste characteristic of the agricultural food product and (ii) a visual characteristic of the agricultural food product; updating a rating of the agricultural food product for an agricultural source based upon the consumer feedback comments, wherein the updating comprises aggregating the received consumer feedback comments with previously supplied consumer feedback comments for the agricultural food product, wherein the aggregating comprises decreasing the rating for a given agricultural food product based upon negative feedback and increasing the rating for a given agricultural food product based upon positive feedback; predicting quality of an agricultural food product from a given agricultural source by correlating (i) the consumer feedback comments and rating for a given agricultural food product with (ii) characteristics of the agricultural source producing the given agricultural food product; and providing, to the agricultural source, at least one recommendation with respect to a farming practice implemented by the given agricultural source, wherein the recommendation is based upon the predicted quality of the agricultural food product.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
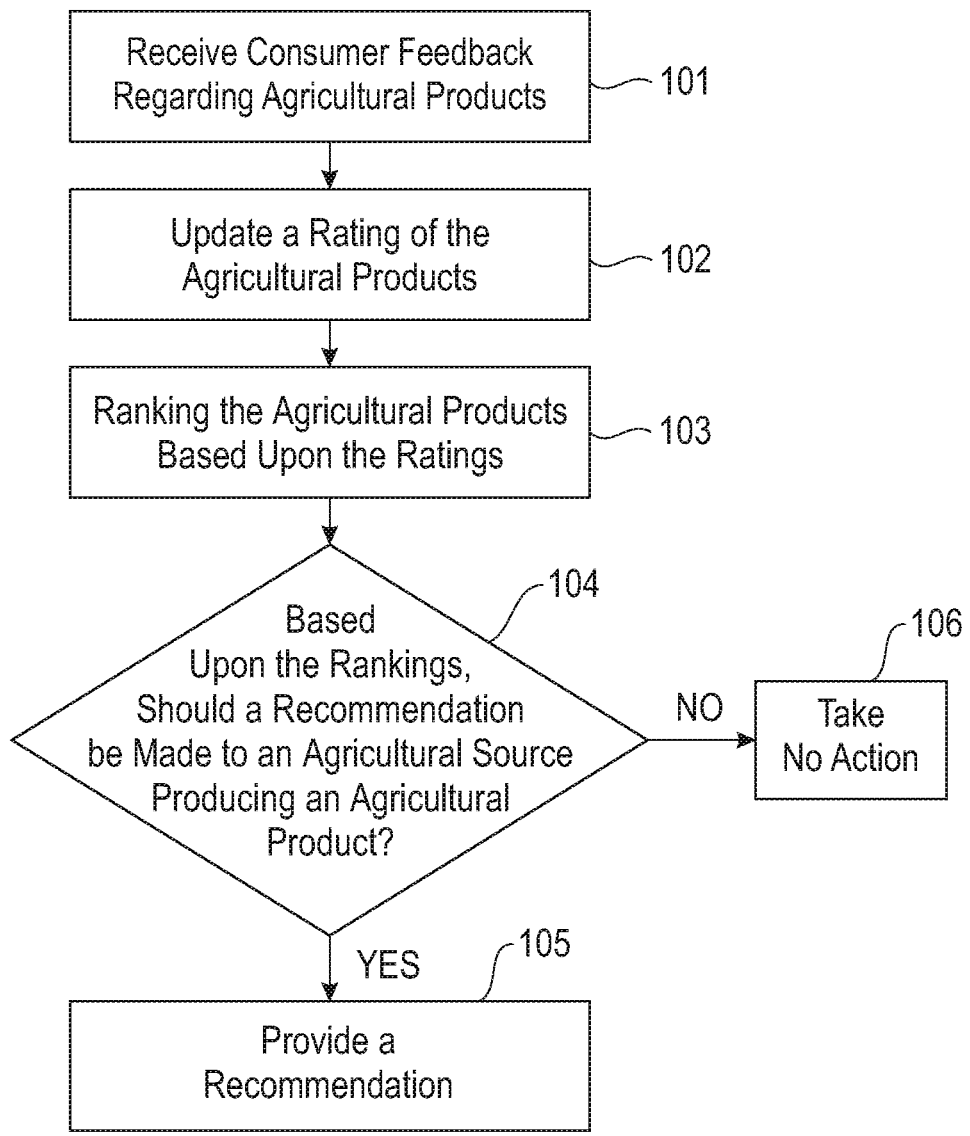
FIG. 1 illustrates a method of providing a recommendation to an agricultural source producing agricultural food products based on consumer feedback comments information and consumer preference.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Utilizing consumer feedback comments to enhance or alter services or products is a common business practice since it is easier for a consumer to provide such feedback and for other consumers to access the feedback. Many applications exist that are directed solely to capturing and providing consumer feedback comments. For example, one such application accepts consumer feedback comments regarding restaurants. The businesses that are being reviewed are also able to access the feedback and may use the feedback to correct any issues identified from negative feedback or capitalize on positive feedback. Additionally, if the consumers identify preferences in the feedback, for example, preference for a particular meal, the restaurant may use this information to offer that meal more frequently or design and offer other meals that have similarities to the preferred meal. For example, if multiple reviews (consumer feedback comments) mention that the restaurant has fantastic steamed dumplings, specifically identifying the softness of the dumpling is what makes the dumpling so good, the restaurant can use this information to continue making the dumplings in the same manner.

Since consumer feedback comments is so easily disseminated, it is very prudent for those who are providing services or producing products to take into account the consumer feedback comments. Continued negative feedback regarding a service or product offered by an entity can be very detrimental to the entity. However, in some industries it is difficult to get feedback to the origin producer, for example, the raw agricultural food production industry that produces raw agricultural food products (e.g., produce, meat, grains, etc.). Additionally, it is difficult to predict the quality, taste, and/or nutrition of an agricultural food product until it has been consumed. However, this information would be helpful to both the producers and retailers who purchase the agricultural food products and then resell them to consumers. In the raw agricultural food production industry conventional techniques are utilized to track farming practices in an attempt to predict yield of a crop or agricultural food product. However, these conventional techniques merely track and help predict crop yield and not whether the agricultural food product is going to be well-received by consumers. Thus, a system and method that identifies consumer feedback comments and preferences for agricultural food products and the ability to predict the quality, taste, and/or nutrition of agricultural food products is useful for the advancement of successful raw agricultural food production techniques.

Additionally, conventional techniques do not provide additional information regarding more detailed consumer preferences, for example, taste preferences, color preferences, quality preferences, and the like. Rather, at best, the traditional systems may provide some details on product preferences or purchasing season preferences, but does not provide a more detailed analysis about what characteristics about the product are desired by the consumer. The inability to provide a more detailed analysis is due to the fact that the traditional systems do not provide a technique for receiving user feedback regarding the product characteristics and providing the same to the producer of the product so that the producer can modify growing practices or techniques to produce the more desirable product.

Accordingly, a system and method are provided for utilizing consumer feedback comments and preference data to enhance farming practices and techniques and also for predicting the taste, quality, and/or nutrition of a produced agricultural food product. The system receives consumer feedback comments regarding agricultural food products. Consumer preferences and feedback may include information related to taste, quality, nutrition, coloring, or any other characteristic of an agricultural food product. Each of the agricultural food products that has corresponding consumer feedback comments has an associated production agricultural source, for example, the farm or facility where the raw food was produced and sourced from.

Based upon the consumer feedback comments for an agricultural food product, the ratings of agricultural food products are updated within a system. For example, the consumer feedback comments that are related to an agricultural food product from a particular agricultural source are aggregated to generate or update a rating for the agricultural food product from that particular agricultural source. The feedback will be based upon a category of agricultural food product produced by the agricultural source, for example, tomatoes, potatoes, beef, wheat, or the like. The feedback that corresponds to one of these categories produced by a single agricultural source will be aggregated to identify the rating of that agricultural food product being produced by that agricultural source. Once the agricultural food products are rated for a particular agricultural source, these agricultural food products can be ranked against other agricultural food products within the same or similar category produced by other agricultural sources. Based upon this ranking, the system can provide a recommendation to an agricultural source regarding adjustments that should be made to the agricultural food product and, therefore, the farming practices, to produce an agricultural food product that is more desirable to more consumers.

Additionally, the system can utilize a prediction engine to predict the taste, quality, or nutrition level of an agricultural food product. Based upon the consumer feedback comments of a product, the system can analyze the farming technique or practices that were used to produce the most desirable agricultural food products. For example, based on differing production variables, such as seed type or cultivar, irrigation, fertilization and pesticide schedules, the soil the agricultural food product is grown in, growing temperature, geographical region, and the like, foods of differing tastes and qualities may be produced. Thus, by correlating these production variables with the consumer feedback comments that identifies desirable agricultural food products, the system may identify which production variables likely result in the desired characteristics. Accordingly, the system may make a prediction regarding the taste, quality, and/or nutrition of an agricultural food product based upon the production variables of a specific agricultural source.

Such a system provides a technical improvement over current systems for enhancing farming practices and agricultural food product characteristics. The described system and method utilize consumer feedback comments to rate agricultural food products and, thereafter, rank the agricultural food products of agricultural sources against agricultural food products of other agricultural sources. The consumer feedback comments provide information related to characteristics of an agricultural food product which can be used to identify production practices or variables that contribute to desirable characteristics. Thus, the described system and method provide a technique for providing recommendations to raw food producers regarding the production practices or variables in order to increase the desirability of the agricultural food product. Conventional techniques do not provide such recommendations, instead only providing information regarding product yield. Thus, the described system and method provide a technique that can enhance agricultural food products making them more desirable, which is not offered with conventional techniques.

FIG. 1 illustrates a method for providing recommendations to an agricultural source producing an agricultural food product based on consumer feedback comments regarding characteristics of the agricultural food product (e.g., taste, quality, coloring, size, nutrition, etc.). At 101 a system receives consumer feedback comments regarding an agricultural food product and related to one or more characteristics of the agricultural food product (e.g., taste, quality, color, size, nutrition, etc.). Receipt of the consumer feedback comments may be via a user manually uploading or providing the feedback to the system, for example, by providing feedback directly in an application of the system, uploading the feedback into the system, providing a link or pointer to a data storage location of the feedback, or the like. Additionally, or alternatively, the system may access the feedback, for example, by accessing a data storage location accessible or coupled to the system, accessing an application that receives the feedback, or the like. In other words, receiving the consumer feedback comments may be performed using any method or technique for obtaining information.

The provided consumer feedback comments may be related to characteristics regarding the taste of a product, for example, bitterness, saltiness, sweetness, sourness, and the like. The provided consumer feedback comments may also be related to characteristics regarding the visual appearance of the product, for example, texture, size, shape, color, and the like. The provided consumer feedback comments may also include information related to other characteristics, for example, plumpness, juiciness, smell, firmness, and the like. These characteristics may all be used together to identify an overall taste, quality, and/or nutrition of the agricultural food product.

A system may aggregate the characteristics provided by a consumer to produce overall consumer preferences regarding the taste, quality, and/or nutrition of agricultural food products. For example, characteristics provided by consumers regarding a desirable apple may describe the apples as firm, crimson, and sweet. On the other hand, characteristics regarding an undesirable apple may describe the apples as soft, spotted, and bitter. Thus, the system can identify an overall consumer preference regarding the apples, specifically, that the firm, crimson, and sweet apples are more desirable than soft, spotted, and bitter apples.

Each of the agricultural food products has a corresponding agricultural source that produced the raw agricultural food product. An agricultural source may be a farm, garden, feedlot, ranch, or any other entity that may produce an agricultural food product (e.g., grain, produce, eggs, meat, dairy, etc.). Thus, the characteristics received by a system may be associated with the agricultural source that produced the agricultural food product. In other words, the consumer feedback comments can be associated with a particular agricultural source and a category of food produced by that agricultural source. A category of food may be a category that each agricultural food product is defined within, for example, carrots, potatoes, celery, eggs, milk, cream, and the like. The categories may also be broken down into sub-categories. For example, a potato category may include sub-categories for fingerling potatoes, Yukon potatoes, Russet potatoes, baking potatoes, and the like.

To identify an agricultural source of an agricultural food product, the system may first identify the geographical area of the consumer who is consuming the agricultural food product. Based upon the geographical area of the consumer, the system can identify the agricultural source that produced the agricultural food product. For example, within a single geographical region there may be only a few agricultural sources that produce a particular agricultural food product. Thus, the agricultural source can be narrowed down to one of these agricultural sources. Further, the system may identify where a consumer purchased a product. Only one or two agricultural sources may supply agricultural food products to a particular retailer or purchasing location. Thus, the agricultural source can be further narrowed down to one of these two agricultural sources. Based upon other information included in the consumer feedback comments, the agricultural source may be further narrowed down. For example, a retailer may only sell a particular sub-category of an agricultural food product from a single agricultural source. Thus, if the consumer identifies the sub-category, the system can narrow the agricultural source down to this single agricultural source. Agricultural sources may also be narrowed down based upon a time of purchase, identification of a particular agricultural source, information captured from the retailer, or the like.

At 102, identifying the agricultural source that provides an agricultural food product may permit a system to provide a rating of the agricultural food product provided from that agricultural source. Rating the agricultural food product may include aggregating the consumer feedback comments that is related to a particular agricultural food product category and a particular agricultural source. In other words, the agricultural food product ratings are unique to the agricultural source that produced the agricultural food product. Thus, each agricultural source that produces an agricultural food product within a particular category will have an agricultural food product rating for that category of agricultural food product. In aggregating the consumer feedback comments, the system not only aggregates all of the incoming consumer feedback comments, but also aggregates the incoming feedback with previously supplied consumer feedback comments. This type of aggregation allows for updating the rating. Additionally, since all of the consumer feedback comments is aggregated, the rating of an agricultural source is not subject to quick rises and falls based upon single batches of the agricultural food product.

The rating may be dynamically updated, for example, in real-time, per agricultural food product delivery, upon receiving a predetermined number of consumer feedback comments, or the like. Thus, the rating is dependent on the agricultural food product produced and then consumed and provides a rating at a particular snapshot in time. The rating may provide an indication of the desirability of agricultural food products produced by a particular agricultural source. For example, agricultural food products having low ratings may indicate that the agricultural source produces undesirable agricultural food products or agricultural food products having characteristics that are undesirable to consumers. On the other hand, agricultural food products having high ratings may indicate that the agricultural source produces desirable agricultural food products or agricultural food products having characteristics that are desirable to consumers. Thus, the agricultural food product ratings may identify which farms are consistently producing desirable or undesirable agricultural food products.

The rating of agricultural food products produced by an agricultural source may assist in ranking the agricultural food products produced by an agricultural source. At 103, ranking the agricultural food products based upon the ratings includes collecting all of the ratings associated with the agricultural food products produced by the agricultural source and comparing the aggregated ratings for the agricultural food product of an agricultural source to the aggregated ratings for the agricultural food product produced by another agricultural source. Thus, the ranking of the agricultural food products is performed across all agricultural sources producing a given agricultural food product, thereby illustrating which agricultural food products are the most and least desirable and from what agricultural source these agricultural food products are produced. It should be understood that agricultural food products that are ranked against each other across agricultural sources are ranked based on the agricultural food product category the agricultural food product is grouped into. This provides a more accurate representation of the agricultural food product desirability rather than the overall agricultural source desirability. However, the system may also rank the agricultural sources utilizing all the agricultural food product rankings. The rankings may also be performed based upon a geographical region of the agricultural food products. Thus, only agricultural food products within the same or similar geographical region may be included in a single ranking.

At 104, a system may determine if a recommendation should be made to an agricultural source that is producing the agricultural food product. In other words, based on the ranking of the agricultural food products, the system may determine that a recommendation should be made to one of the agricultural sources. A recommendation may be made regardless of the ranking. However, the recommendation may change based upon the ranking. For example, an agricultural source having high ranking agricultural food products may receive a recommendation to continue to produce agricultural food products having the same characteristics as a previously produced agricultural food product. On the other hand, a recommendation for an agricultural source having low ranking agricultural food products may be a recommendation identifying characteristics that should be changed and what the characteristics should be based upon the consumer feedback comments.

If the system determines that a recommendation does not need to be made at 104, the system may take no action at 106. If, on the other hand, the system determines that a recommendation should be made at 104, the system may provide a recommendation to an agricultural source. The recommendation to the agricultural source may include providing recommendations for growing techniques, seed type or cultivar, irrigation, fertilization and pesticide schedules, and the like. The recommendations provided to the agricultural sources may vary in detail. For example, the recommendation provided to the agricultural source may be vague, for example, the apple should be a redder color rather than spotted. As another example, the recommendation may be specific, for example, the apple seed should be planted eight inches below ground and watered twice a day until a sprout is formed. It should be understood that these are non-limiting examples of recommendations and other recommendations may be provided, for example, regarding irrigation, fertilizer schedules, soil moisture levels, and the like.

Recommendations may be determined and generated using a correlation between high ranking agricultural food products or agricultural food products having positive feedback and characteristics of the production facility producing the high-ranking agricultural food products. Characteristics of the production facility may include soil moisture, seed type or cultivar, irrigation, fertilization and pesticide schedules, growth time, feed ratios, weather conditions, growing season, geographical location, and the like. The system may then take these characteristics for all of the agricultural sources and make a correlation between the characteristics of the production facility and the ranking of an agricultural food product. The system may employ a machine-learning model to make these correlations, where the machine-learning model continuously learns from predictions made by the model and outcomes of those predictions, thus making the machine-learning model more accurate over time as more information is provided to the model. The machine-learning model is trained using the historical consumer feedback comments regarding characteristics of agricultural food products and the characteristics of the agricultural sources.

Additionally, utilizing the correlation between the production facility characteristics and agricultural food product characteristics, the system can generate an agricultural food product taste, quality, and/or nutrition prediction for an agricultural food product that has not yet been produced. Based upon the identified correlations and the trained machine-learning model, the model can ingest characteristics of a target agricultural source. The model can then predict the characteristics of an agricultural food product produced by that target agricultural source. The predicted characteristics may include taste, nutrition, and/or quality characteristics. Additionally, the provided recommendation may be based upon the predicted characteristics and may, therefore, take into account the agricultural food product quality prediction. Thus, the system may utilize the taste prediction engine that is a multiple variable prediction engine that may utilize the highest rated characteristics associated with an agricultural food product and agricultural source characteristics. The engine may determine agricultural source characteristics that are needed to produce an agricultural food product having a preferred taste, quality, and/or nutrition. The taste prediction engine may output the taste category that describes the multi-variable characteristics necessary to produce the desired tasting agricultural food product.

Figure 2:
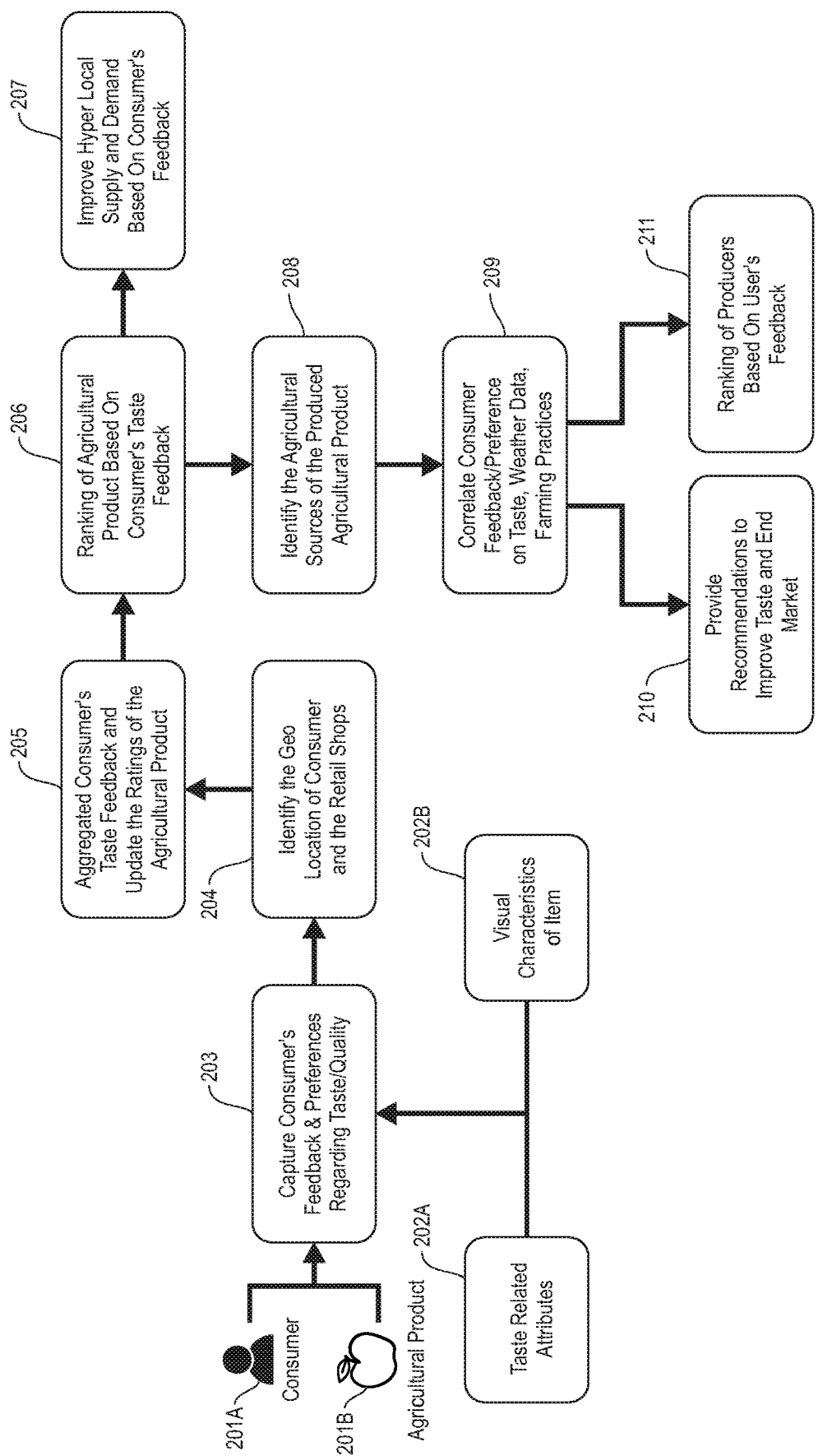
FIG. 2 illustrates an example system diagram for utilizing consumer feedback comments and preference information regarding an agricultural food product to (i) improve the supply and demand locally, (ii) provide recommendations to improve the taste and/or quality of an agricultural food product throughout a market, and (iii) rank the agricultural sources of the agricultural food product based on the consumer feedback comments.

FIG. 2 illustrates a system architecture for utilizing consumer feedback comments and preference information regarding an agricultural food product to improve the supply and demand locally, provide recommendations to the improve the taste, nutrition, and/or quality of an agricultural food product throughout a market, and rank the agricultural sources of the agricultural food product based on the consumer feedback comments. A consumer 201A may provide feedback regarding an agricultural food product 201B. The feedback information may be characteristics describing taste attributes 202A and visual characteristics of the agricultural food product 202B. Thus, the system captures the consumer's feedback and preferences regarding the taste, nutrition, and/or quality of the agricultural food product as seen at 203.

At 204, the system may identify the geographical location of the consumer and the retail shops surrounding the location of the consumer that may be providing or selling an agricultural food product. By identifying the geographical location of the consumer and/or retail shops providing an agricultural food product, the system can group agricultural food products based upon geographical location or region. The system may then aggregate the consumer feedback comments at 205, to update the rating of the agricultural food product. In updating the rating, the system may aggregate both the received consumer feedback comments and any historical consumer feedback comments associated with the agricultural food product. In other words, the ratings of the agricultural food products produced at an agricultural source are continuously updated to provide the most accurate ratings.

The ratings produced for an agricultural food product produced across multiple agricultural sources may then be compared against the same agricultural food product produced by other agricultural sources to provide a ranking of the agricultural food product across the multiple agricultural sources at 206. The rankings may be done for a geographical location, for example, the one identified at 204, or may be done across all possible agricultural sources. These rankings produced at 206, may be used to improve local supply and demand based upon the consumer feedback comments at 207. The rankings may provide local retailers with the ability to determine what agricultural sources to utilize for an agricultural food product.

At 208 the agricultural sources that produce the agricultural food product having a particular ranking may be identified. The system may obtain the production characteristics, for example, weather data, farming practices, growth season, and the like. The system may correlate these production characteristics with the consumer feedback comments regarding the taste, nutrition, and/or quality of an agricultural food product at 209. Based on this correlation, the system may, at 210, provide a recommendation to an agricultural source in order to improve the taste of an agricultural food product and improve the end market for the agricultural source. If the agricultural food product taste, quality, or nutrition cannot be improved, the recommendation may simply be to recommend the agricultural food product to the retailer, consumer, or other purchaser instead of providing a recommendation to the producer on how to improve the agricultural food product. The correlations may also be used to determine the highest quality agricultural sources. At 211, a system may rank the agricultural sources based on the consumer feedback comments associated with the agricultural source.

Figure 3:
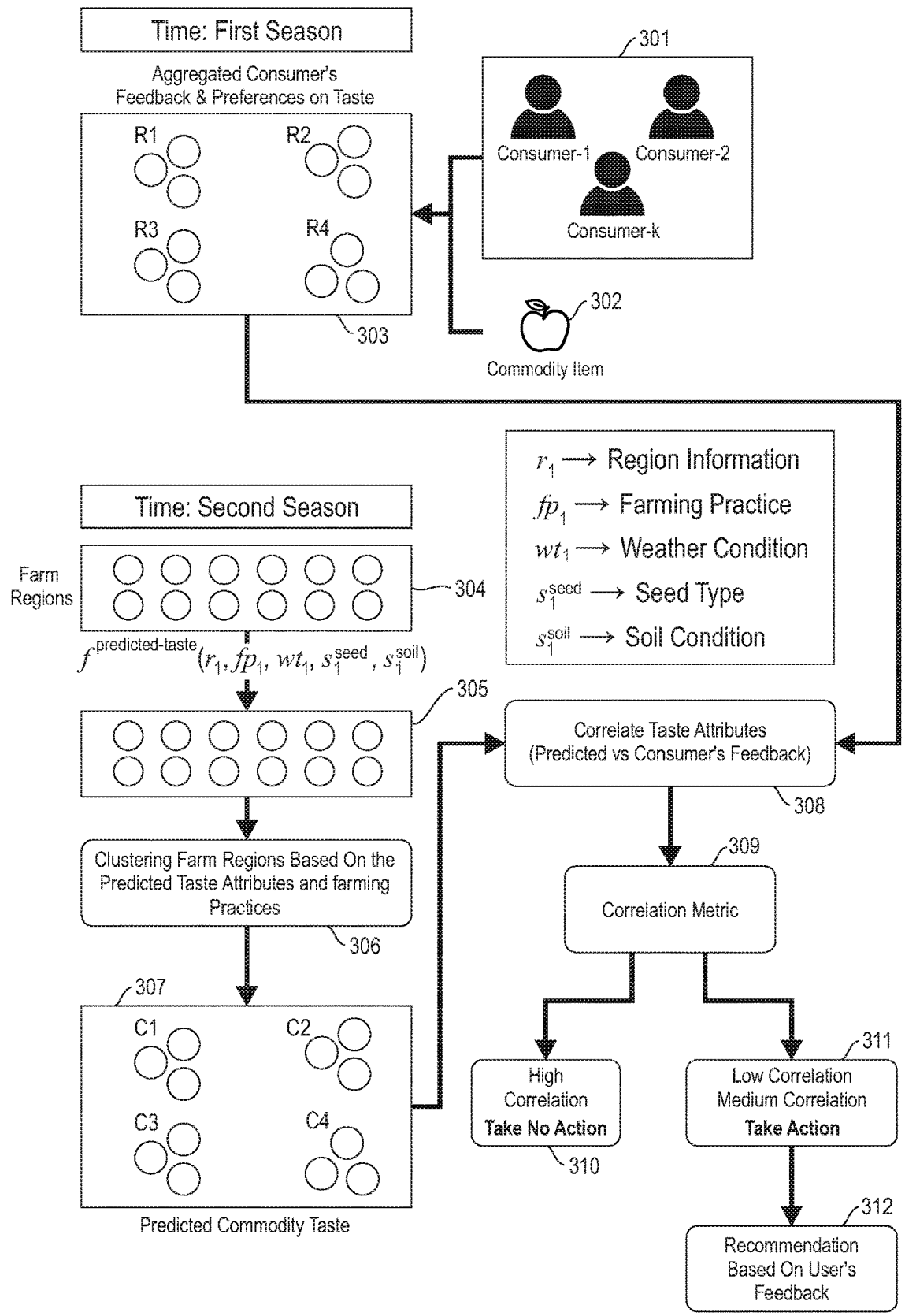
FIG. 3 illustrates an example system diagram for determining a recommendation for an agricultural source based on the correlation metric produced between an agricultural food product's predicted taste and consumer feedback comments data.

When generating a recommendation to be made to an agricultural source based on the received consumer feedback comments and the established consumer preference information, a system may correlated the user preferences corresponding to an agricultural food product to the techniques and characteristics associated with an agricultural source. FIG. 3 illustrates an example system and method for correlating aggregated consumer feedback comments and preference information with farm regions producing an agricultural food product. Starting with the information regarding the first season, a system may accept consumer feedback comments information 301 and agricultural food product information 302. Receipt of the consumer feedback comments information 301 and agricultural food product information 302 may be similar to the technique described in FIG. 2, steps 201A-B, and 202A-B.

The system takes the received consumer feedback comments information 301 and agricultural food product information 302 and aggregates this information into similar categories and clusters 303. Based on the collected information, a system may determine which features of an agricultural food product, including both taste features and visual features, are similar and group the similar features. These features can assist in identifying characteristics of the products that are found together. Using an example of strawberries, after categorizing the strawberries based on taste, a system may identify that the sweet tasting strawberries also have a bright, red color, while the bitter tasting strawberries have a dull or lighter red color.

During a second growing season, a system may first correlate tracked farm regions 304 that produce a particular agricultural food product with the quality of the agricultural food product produced by a given farm region. The system may also track characteristics for the farm regions, for example, region information, farming practice, weather condition, seed type, soil condition, and the like. These variable characteristics between farm regions may affect the growth of an agricultural food product, which may ultimately influence the taste and visual characteristics of an agricultural food product. Thus, the system can predict the taste, quality, and/or nutrition characteristics for an agricultural food product produced at a particular farm region. At 305, a system may take into account the variable farming characteristics as well as the previously input agricultural food product information to determine which farm regions may produce agricultural food products having similar taste, quality, and/or nutrition characteristics. A system may then cluster the farm regions based on the predicted taste attributes and farming practices 306, thereby allowing the system to cluster agricultural food products based on the predicted agricultural food product taste 307.

Once predicted agricultural food products are clustered 307 and the consumer feedback comments and preferences are clustered 303, the system may attempt to correlate the taste attributes 308 between the predicted agricultural food product taste 307 and the aggregated consumer feedback comments and preference data regarding taste 303. A correlation taste attribute 308 may be produced and then provided to a system as a correlation metric 309. The correlation metric 309 may identify a correlation between the predicted taste of an agricultural food product and the consumer feedback comments regarding taste information. In the event that a high correlation 310 between the predicted taste and the consumer feedback comments regarding taste information is identified, no recommendation for the producer (e.g., regarding the farming practices, fertilizer schedules, soil moisture levels, growing seasons, etc.) is needed.

A high correlation means that the produced product is likely to be desirable to the consumer based upon the feedback and preferences of the consumers. In the event that a low or medium correlation 311 between the predicted taste and the consumer feedback comments taste information is identified, a recommendation 312 may be made to the producer. The recommendation 312 that is provided may be based upon identification of the difference between the predicted taste, quality, and/or nutrition and the consumer preferences. Thus, the recommendation may include recommending a change in farming practice, a change in harvest time, a change in irrigation technique, a change in seed type, a change in fertilizer, and the like.

Figure 4:
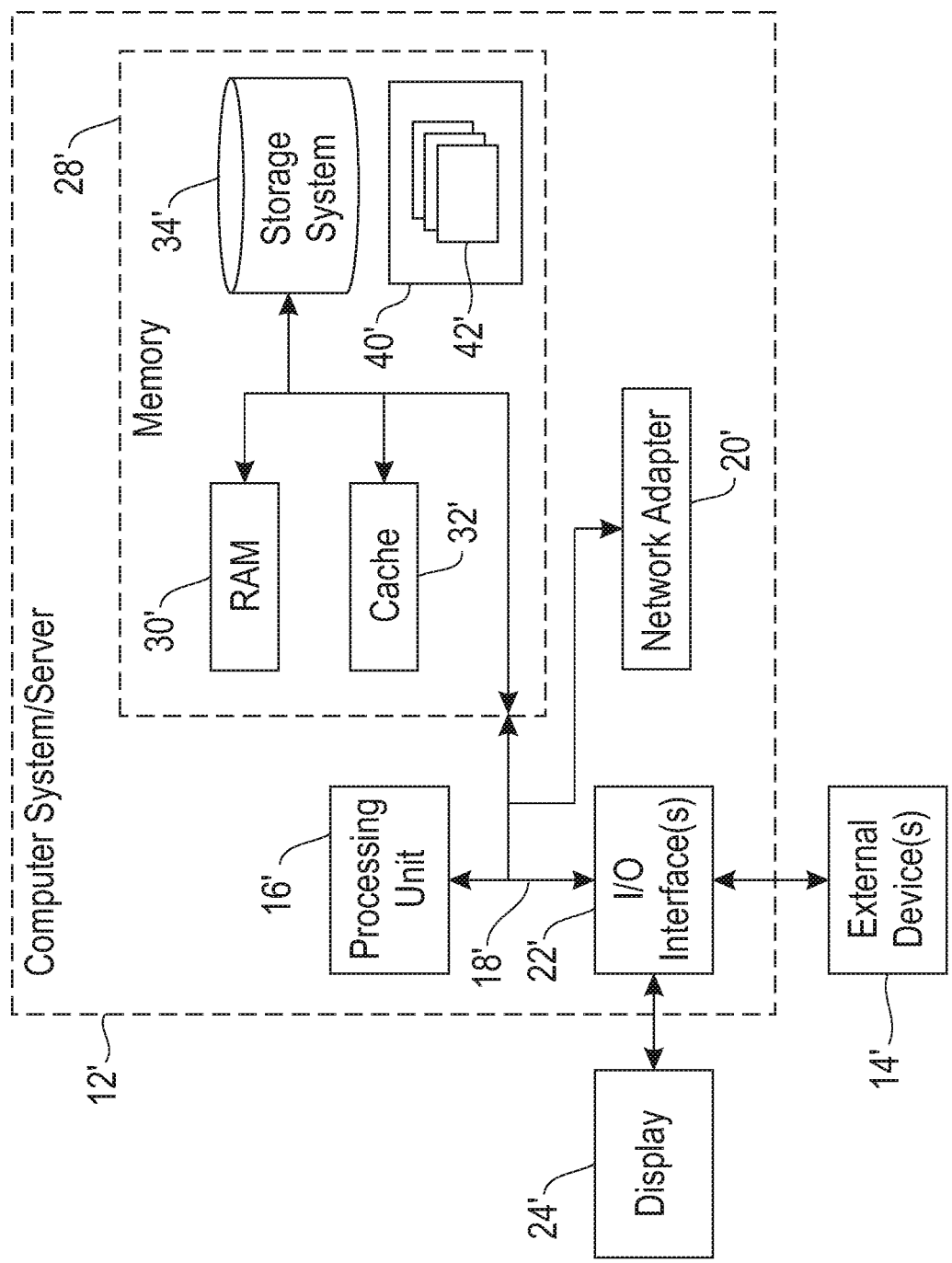
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, at an information handling device utilizing a prediction engine, a plurality of consumer feedback comments regarding one of a plurality of agricultural food products, wherein each of the plurality of consumer feedback comments comprises information regarding a characteristic of a given agricultural food product, wherein each of the plurality of agricultural food products corresponds to an agricultural source producing an agricultural food product category, wherein a geographical location of each of the plurality of consumers of one of the plurality of agricultural food products is identified and identifies the agricultural source that produced the one of the plurality of food products consumed, wherein the receiving the plurality of consumer feedback comments comprises identifying agricultural food products having at least one of: a positive consumer feedback comment and a negative consumer feedback comment;
   dynamically updating, in real-time as consumer feedback comments are received, a rating of each of the plurality of agricultural food products based upon the consumer feedback comments corresponding to a given agricultural food product, wherein the updating comprises aggregating the received consumer feedback comments with previously supplied consumer feedback comments for agricultural food products within the agricultural food product category of a given agricultural source, wherein the rating of each of the plurality of agricultural food products comprises identifying characteristics of agricultural sources of the identified food products;
   ranking the plurality of agricultural food products based upon the ratings of the plurality of agricultural food products, wherein the ranking comprises ranking the plurality of agricultural food products against other agricultural food products within an agricultural food product category that are produced by different agricultural sources; training a machine-learning model based on a plurality of input, wherein the plurality of input includes the plurality of consumer feedback comments with respect to at least, one or more of, taste, quality, or nutrition, and characteristics of the agricultural sources identified, including, one or more of, a geographic region, weather data, farming practices, or a growth season, wherein the machine-learning model is trained to identify correlations between the ranking of the plurality of agricultural food products and the characteristics of the agricultural sources identified, wherein the machine-learning model is continuously trained over time based on at least additional input, previous predictions, and outcomes corresponding to the previous predictions;
   generating, utilizing the prediction engine, a prediction of a characteristic for at least one agricultural food product not yet produced based upon at least one correlation identified by the machine-learning model between characteristics of the agricultural source and the ranking of the plurality of agricultural food products; and
   providing, to the agricultural source, utilizing the prediction engine, and
   based upon the prediction of a characteristic for at least one agricultural food product not yet produced, at least one recommendation with respect to a farming practice implemented by the given agricultural source, wherein the recommendation is based upon the ranking of an agricultural food product produced by the given agricultural source and the at least one correlation identified using the machine-learning model, wherein the at least one recommendation with respect to farming practice includes at least, one or more of, a change in harvest time, a change in irrigation technique, a change in seed type, or a change in fertilizer, correlating to at least one characteristic preferred by consumers from the taste, the quality, or the nutrition of the at least one agricultural food product not yet produced.

2. The method of claim 1, wherein the consumer feedback comments comprises information related to visual characteristics of the agricultural food product.

3. The method of claim 1, comprising ranking agricultural sources producing agricultural food products based upon the rankings of agricultural food products produced by a given agricultural source.

4. The method of claim 1, wherein the ranking comprises ranking agricultural food products that are produced within a geographical region.

5. An apparatus, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

program instructions, stored on at least one of the one or more computer-readable storage media for execution by at least one of the one or more processors via at least one of the one or more memories, to receive, utilizing a prediction engine, a plurality of consumer feedback comments regarding one of a plurality of agricultural food products, wherein each of the plurality of consumer feedback comments comprises information regarding a characteristic of a given agricultural food product, wherein each of the plurality of agricultural food products corresponds to an agricultural source producing an agricultural food product category, wherein a geographical location of each of the plurality of consumers of one of the plurality of agricultural food products is identified and identifies the agricultural source that produced the one of the plurality of food products consumed, wherein the receiving the plurality of consumer feedback comments comprises identifying agricultural food products having at least one of: a positive consumer feedback comment and a negative consumer feedback comment;

program instructions, stored on at least one of the one or more computer-readable storage media for execution by at least one of the one or more processors via at least one of the one or more memories, to dynamically update, in real-time as consumer feedback comments are received, a rating of each of the plurality of agricultural food products based upon the consumer feedback comments corresponding to a given agricultural food product, wherein the updating comprises aggregating the received consumer feedback comments with previously supplied consumer feedback comments for agricultural food products within the agricultural food product category of a given agricultural source, wherein the rating of each of the plurality of agricultural food products comprises identifying characteristics of agricultural sources of the identified food products;

program instructions, stored on at least one of the one or more computer-readable storage media for execution by at least one of the one or more processors via at least one of the one or more memories, to rank the plurality of agricultural food products based upon the ratings of the plurality of agricultural food products, wherein the ranking comprises ranking the plurality of agricultural food products against other agricultural food products within an agricultural food product category that are produced by different agricultural sources;

program instructions, stored on at least one of the one or more computer-readable storage media for execution by at least one of the one or more processors via at least one of the one or more memories, to train a machine-learning model based on a plurality of input, wherein the plurality of input includes the plurality of consumer feedback comments with respect to at least, one or more of, taste, quality, or nutrition, and characteristics of the agricultural sources identified, including, one or more of, a geographic region, weather data, farming practices, or a growth season, wherein the machine-learning model is trained to identify correlations between the ranking of the plurality of agricultural food products and the characteristics of the agricultural sources identified, wherein the machine-learning model is continuously trained over time based on at least additional input, previous predictions, and outcomes corresponding to the previous predictions;

program instructions, stored on at least one of the one or more computer-readable storage media for execution by at least one of the one or more processors via at least one of the one or more memories, to generate, utilizing the prediction engine, a prediction of a characteristic for at least one agricultural food product not yet produced based upon at least one correlation identified by the machine-learning model between characteristics of the agricultural source and the ranking of the plurality of agricultural food products; and program instructions, stored on at least one of the one or more computer-readable storage media for execution by at least one of the one or more processors via at least one of the one or more memories, to provide, to the agricultural source, utilizing the prediction engine, and based upon the prediction of a characteristic for at least one agricultural food product not yet produced, at least one recommendation with respect to a farming practice implemented by the given agricultural source, wherein the recommendation is based upon the ranking of an agricultural food product produced by the given agricultural source and the at least one correlation identified using the machine-learning model, wherein the at least one recommendation with respect to farming practice includes at least, one or more of, a change in harvest time, a change in irrigation technique, a change in seed type, or a change in fertilizer, correlating to at least one characteristic preferred by consumers from the taste, the quality, or the nutrition of the at least one agricultural food product not yet produced.

6. A computer program products comprising:

one or more computer readable storage media, and program instructions collectively stored on the one or more computer readable storage media, the program instructions comprising:

program instructions, stored on at least one of the one or more computer-readable storage media, to receive, utilizing a prediction engine, a plurality of consumer feedback comments regarding one of a plurality of agricultural food products, wherein each of the plurality of consumer feedback comments comprises information regarding a characteristic of a given agricultural food product, wherein each of the plurality of agricultural food products corresponds to an agricultural source producing an agricultural food product category, wherein a geographical location of each of the plurality of consumers of one of the plurality of agricultural food products is identified and identifies the agricultural source that produced the one of the plurality of food products consumed, wherein the receiving the plurality of consumer feedback comments comprises identifying agricultural food products having at least one of: a positive consumer feedback comment and a negative consumer feedback comment;

program instructions, stored on at least one of the one or more computer-readable storage media, to dynamically update, in real-time as consumer feedback comments are received, a rating of each of the plurality of agricultural food products based upon the consumer feedback comments corresponding to a given agricultural food product, wherein the updating comprises aggregating the received consumer feedback comments with previously supplied consumer feedback comments for agricultural food products within the agricultural food product category of a given agricultural source, wherein the rating of each of the plurality of agricultural food products comprises identifying characteristics of agricultural sources of the identified food products;

program instructions, stored on at least one of the one or more computer-readable storage media, to rank the plurality of agricultural food products based upon the ratings of the plurality of agricultural food products, wherein the ranking comprises ranking the plurality of agricultural food products against other agricultural food products within an agricultural food product category that are produced by different agricultural sources;

program instructions, stored on at least one of the one or more computer-readable storage media, to train a machine-learning model based on a plurality of input, wherein the plurality of input includes the plurality of consumer feedback comments with respect to at least, one or more of, taste, quality, or nutrition, and characteristics of the agricultural sources identified, including, one or more of, a geographic region, weather data, farming practices, or a growth season, wherein the machine-learning model is trained to identify correlations between the ranking of the plurality of agricultural food products and the characteristics of the agricultural sources identified, wherein the machine-learning model is continuously trained over time based on at least additional input, previous predictions, and outcomes corresponding to the previous predictions;

program instructions, stored on at least one of the one or more computer-readable storage media, to generate, utilizing the prediction engine, a prediction of a characteristic for at least one agricultural food product not yet produced based upon at least one correlation identified by the machine-learning model between characteristics of the agricultural source and the ranking of the plurality of agricultural food products; and program instructions, stored on at least one of the one or more computer-readable storage media, to provide, to the agricultural source, utilizing the prediction engine, and based upon the prediction of a characteristic for at least one agricultural food product not yet produced, at least one recommendation with respect to a farming practice implemented by the given agricultural source, wherein the recommendation is based upon the ranking of an agricultural food product produced by the given agricultural source and the at least one correlation identified using the machine-learning model, wherein the at least one recommendation with respect to farming practice includes at least, one or more of, a change in harvest time, a change in irrigation technique, a change in seed type, or a change in fertilizer, correlating to at least one characteristic preferred by consumers from the taste, the quality, or the nutrition of the at least one agricultural food product not yet produced.

7. The computer readable program code of product 6, wherein the consumer feedback comments comprises information related to visual characteristics of the agricultural food product.

8. The computer readable program code of product 6, comprising ranking agricultural sources producing agricultural food products based upon the rankings of agricultural food products produced by a given agricultural source.

\* \* \* \* \*